United States Patent
Tran et al.

(10) Patent No.: US 8,680,699 B2
(45) Date of Patent: Mar. 25, 2014

(54) LIGHTING SYSTEM FOR PEDICURE SPA

(71) Applicant: Gulfstream Inc., Cambridge (CA)

(72) Inventors: Minh Sang Tran, Cambridge (CA); Christopher Alexander, Cambridge (CA)

(73) Assignee: Gulfstream Inc., Cambridge, Ontario (CA)

( * ) Notice: Subject to any disclaimer, the term of this patent is extended or adjusted under 35 U.S.C. 154(b) by 0 days.

(21) Appl. No.: 13/962,663

(22) Filed: Aug. 8, 2013

(65) Prior Publication Data
US 2013/0323092 A1   Dec. 5, 2013

Related U.S. Application Data

(63) Continuation of application No. 12/950,409, filed on Nov. 19, 2010, now Pat. No. 8,531,048.

(51) Int. Cl.
*F03G 7/00*   (2006.01)

(52) U.S. Cl.
USPC .................................................. 290/1 R (58) Field of Classification Search
USPC .................................................. 290/1 R
See application file for complete search history.

(56) References Cited

U.S. PATENT DOCUMENTS 8,531,048 B2 *   9/2013   Tran et al. ............ 290/1 R

* cited by examiner

*Primary Examiner* — Tho D Ta
(74) *Attorney, Agent, or Firm* — Jones Walker LLP (57) ABSTRACT

A light kit in combination with a pump system. The light kit includes a coil and a LED, where power produce by the coil when exposed to a rotating magnetic field powers the LEDs. The pump has a housing defining a pump interior, a driven magnet coupled to a pump impellor positioned in the pump interior, where the pump housing has an inlet and an outlet, and the is to be immersed in a fluid and to pump a fluid through the interior of the pump from the inlet to the outlet.

15 Claims, 8 Drawing Sheets

LIGHTING SYSTEM FOR PEDICURE SPA

PRIORITY

This application is a continuation of U.S. application Ser. No. 12/950,409 filed Nov. 19, 2010, and this application claims the priority benefit thereof, and which application is incorporated by reference.

FIELD OF THE INVENTION

The present invention relates to magnetically driven centrifugal pumps, more particularly, lighting systems for magnetically driven centrifugal pumps.

BACKGROUND OF THE INVENTION

Small pump applications, for instance for use in footspas or aquariums, generally are either propeller driven axial pumps, or centrifugal impeller type pumps. For purposes of this application, a "centrifugal pump" includes both propeller driven axial pumps, and an impeller and volute combination. The pump may be directly driven by a motor, or indirectly driven by the motor. In an indirect drive, the pump is mechanically isolated from the motor, but linked to the motor via magnetic forces. In a mechanically isolated pump, the driving forces to the pump are communicated via a driving magnet positioned on the motor, and a driven magnet positioned on the pump. Examples of this type of pump can be seen in U.S. Pat. No. 7,393,188 (hereby incorporated by reference), U.S. patent application Ser. No. 12/483,850 (hereby incorporated by reference), and Canadian application number 2706306 (hereby incorporated by reference).

DETAILED DESCRIPTION OF THE INVENTION

Figure 1:
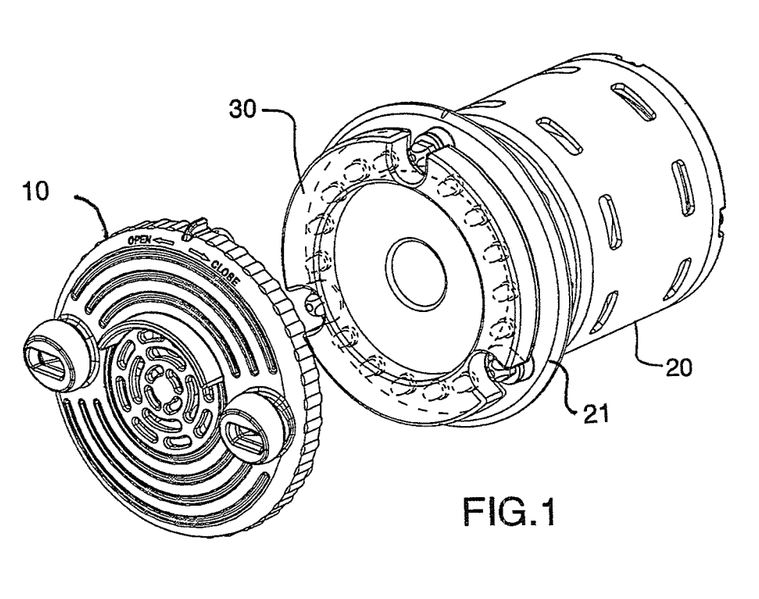
FIG. 1 is a front perspective partially exploded view of one embodiment of the pump and light kit.

Shown in FIG. 1 is a mechanically isolated pump system, including a pump 10, a motor 20, and a light kit 30. The shaft of the motor is not mechanically coupled to the pump, hence mechanically isolating the pump from the motor. The pump contains a pump housing, a driven magnet, and a pumping member coupled to the magnet (an impeller or propeller). See FIG. 4 of U.S. application Ser. No. 12/483,850, and FIG. 13C of Canadian application number 2706306. The motor 20 is coupled to a driving magnet, which is generally mounted on the motor shaft. See FIGS. 14B and 15B of Canadian application number 2706306.

The motor is mounted adjacent to the exterior side wall of the spa basin, aquarium or other tank (such as shown in FIG. 3 of U.S. patent application Ser. No. 12/483,850) or FIGS. 14A and 14B of Canadian application number 2706306, thereby placing the driving magnet adjacent the tank exterior side wall. The pump is positioned in the interior of the tank near the motor, to place the driving magnet and driven magnet in close proximity in order to magnetically couple the two magnets. In many applications it is desired that the integrity of the tank not be compromised (such as in an aquarium), in which event, tank sidewall penetration to accommodate a motor or motor mount is not desired. In this event, the pump housing can positioned against the interior wall of the tank opposite the motor to magnetically couple the driving and driven magnet, providing motive power to the pump when the motor is operating (thereby activating the pump), such as shown in FIG. 3 of U.S. patent application Ser. No. 12/483,850.

For many applications, such as in a foot spa, it is desired that the pump housing remain substantially stationary when the pump is activated. To minimize movement of the pump resulting from torque forces of the driven magnet and pumped fluid on the pump housing, the pump or pump housing can be mechanically coupled to the tank, tank sidewall, or other fixed point. For instance, the pump housing can be attached to an aeration device or other support, where the support is coupled to the tank. Alternatively, the pump housing may be held in place against a flange body that is fixedly attached to the interior tank wall (such as with epoxy, screws, etc.), or a flange body that is molded as a series of projections (or depressions) into the tank sidewall. Other mechanical coupling geometries or fixtures can be used to mechanically fix the position of the pump housing with respect to the interior wall of the tank or spa.

Other means can be used to fix the pump housing in position. For instance, the tank sidewall may have an opening therethrough, and a sealing flange sealing the opening, such as described in Canadian patent application number 2706306. For the following description of the light kit, the pump 10 is mounted on a flange 21 that seals an opening in the tank sidewall, where the motor 20 is also coupled to the exterior facing portion of the flange 21. However, the light kit 30 can be used with any type of pump mount, or mounted separate but adjacent to at least one of the driving or driven magnets, or mounted to the motor mount, if, for instance, the flange or tank sidewall is constructed from transparent or clear materials.

Figure 2:
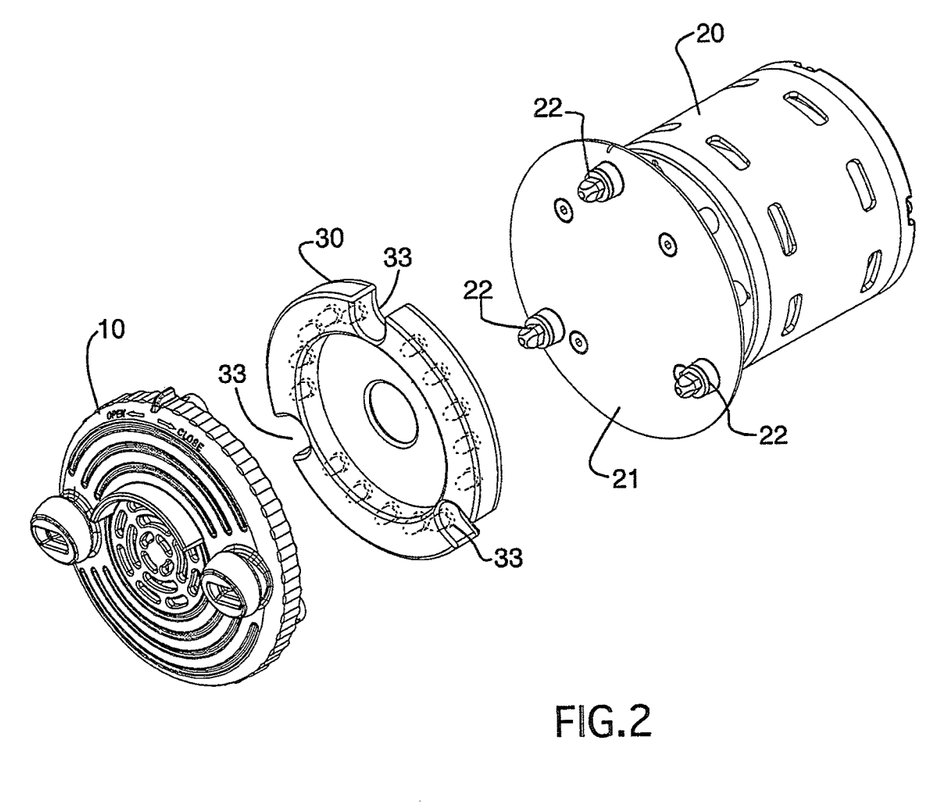
FIG. 2 is a front perspective partially exploded view of one embodiment of the pump and light kit.

As shown in FIG. 2, the sealing flange 21 includes projecting members 22 into which the pump 10 snaps via openings 15 on the rear face of the pump housing. Housing 10 snaps in place via matching slots in the rear of the pump housing. As shown in FIG. 3B, light kit 10 includes a light kit housing 32 sealingly encompassing the electrical components. The light kit housing 32, at least near the light emitting diodes (or other low power consumption light, all considered as LEDs), is transparent. In the embodiment shown, the light kit 30 is constructed from injection molded plastic. Light kit housing 32 may be fixedly attached to pump 10 (such as to the pump housing), the sealing flange 21, the tank sidewall, or even the motor (if the tank or sealing flange is constructed of clear or transparent materials). Alternatively, as shown in FIG. 2, light kit 30 is sandwiched between the pump housing 10 and sealing flange 21. The light kit housing has cutouts 33 to allow the kit 30 to be trapped between the sealing flange 21 and pump 10, without fixedly attaching the light kit to either the sealing flange 21, tank or pump 10. Additionally, the housing may have a center opening 36 therethough to allow fluid to reach the rear of the pump to provide lubricity to a support bearing, as described in U.S. patent application Ser. No. 12/483,850.

To enhance the light kit's effect, the pump housing is constructed of clear plastic. The light kit may also be built into the pump housing or the sealing flange.

Figure 3A:
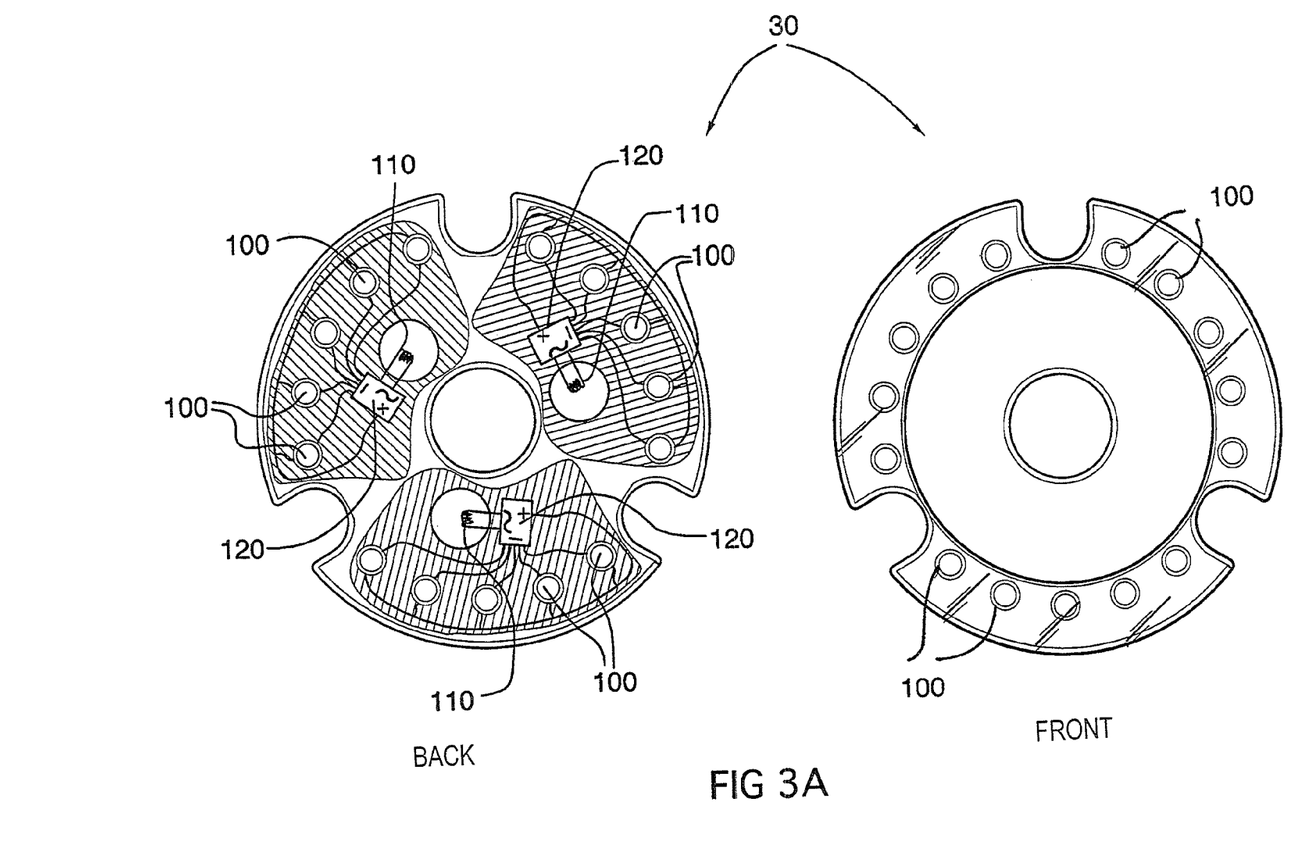
FIG. 3A is a front and rear view of one embodiment of the light kit.
Figure 3B:
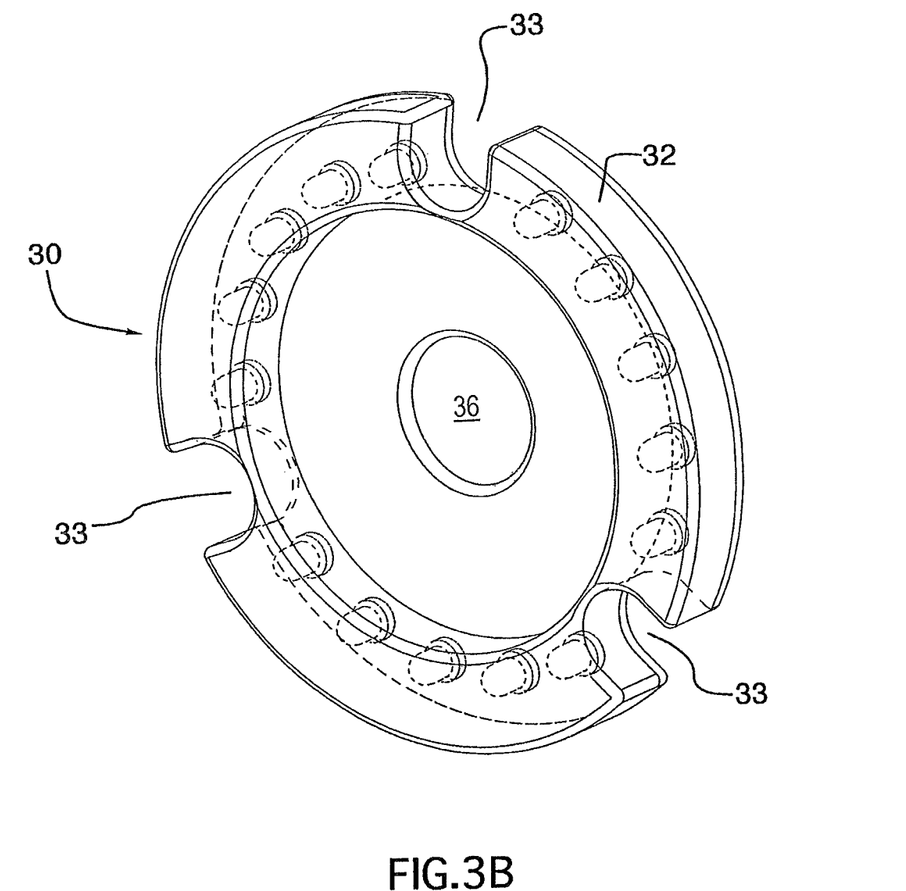
FIG. 3B is a prospective view of a light kit housing.
Figure 4A:
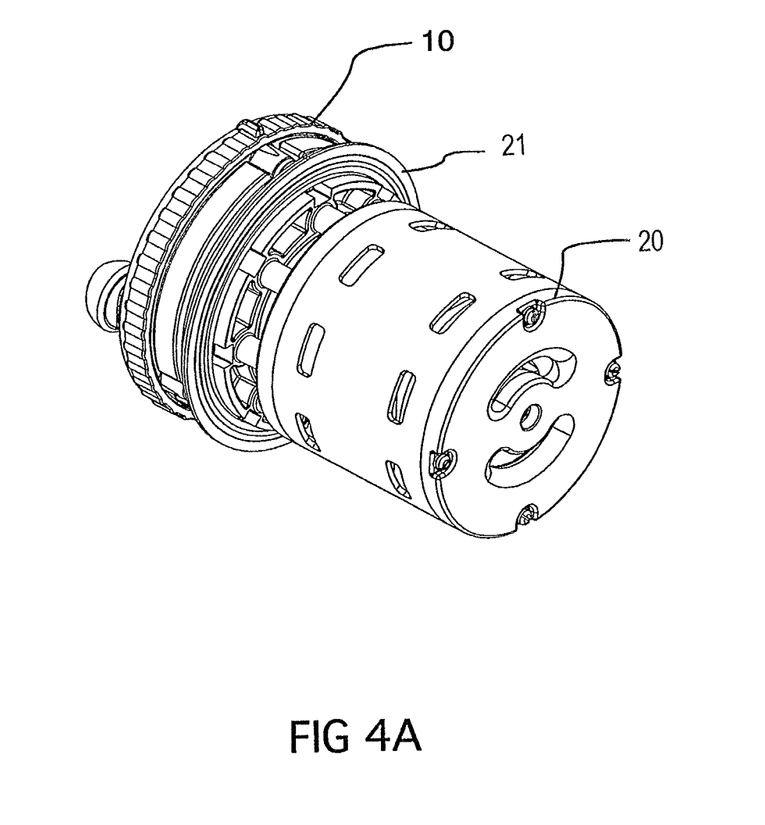
FIG. 4A is a rear prospective view of one embodiment of the pump system.
Figure 4B:
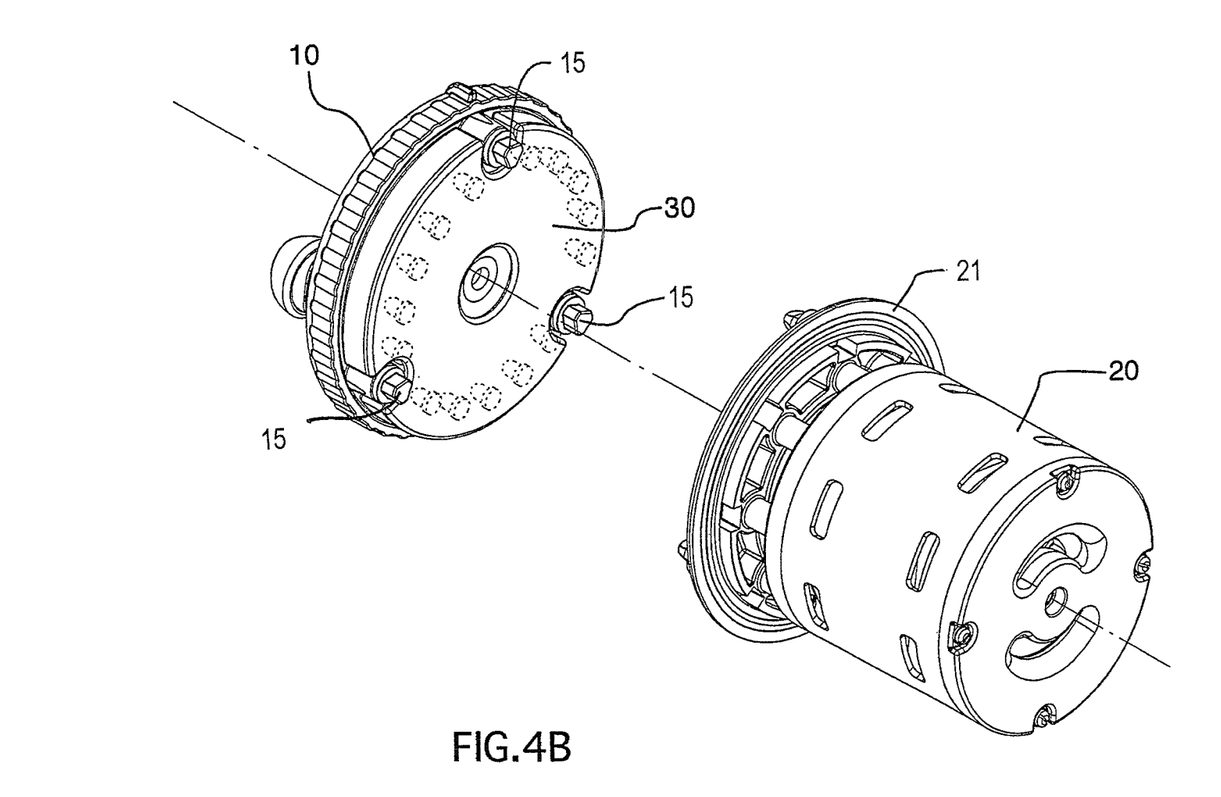
FIG. 4B is a rear partially exploded view of the pump system of FIG. 4A.
Figure 5:
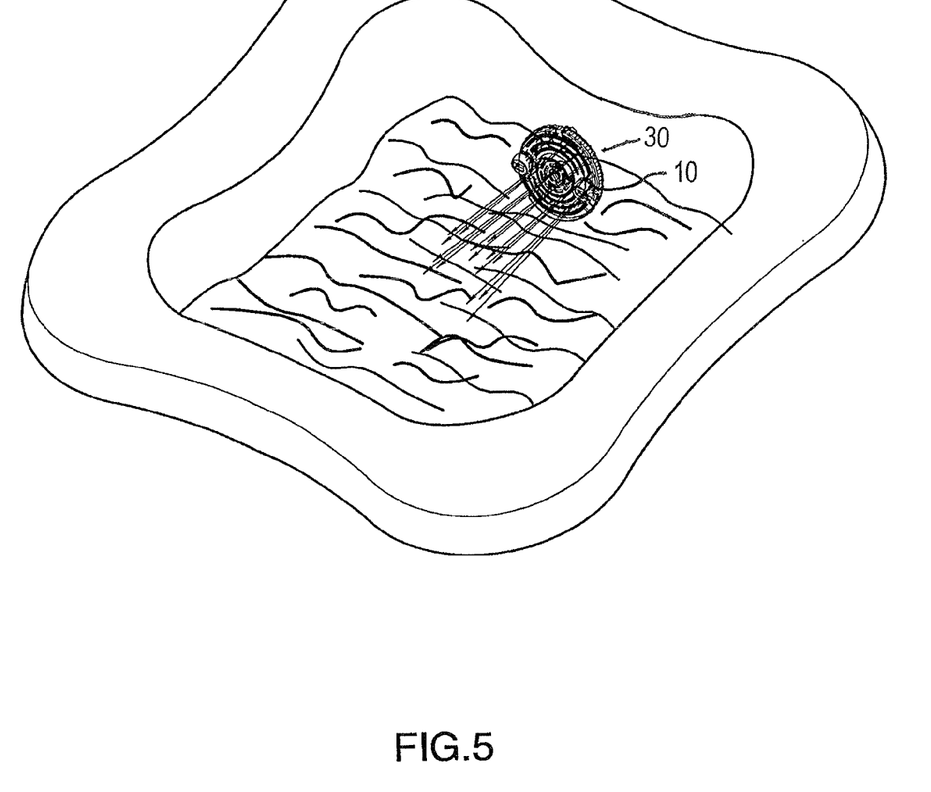
FIG. 5 is a prospective view of a tank with an installed pump system of FIG. 4A.

The basic electrical components of the light kit 10, as shown in FIG. 3A, include light emitting diodes or other low power consumption lights (hereafter "LEDs") 100, and a coil 110, electrically connected to the LEDs. Additional electrical components (such as resisters and capacitors) may be needed to balance the circuit based upon the chosen coil (inductor) and LED characteristics. In operation, the coil is exposed to the magnetic field generated by the rotating driving and driven magnets, and hence an induced EMF is produced, generating an AC electrical current to power the LEDs. Preferably, the coil 110 is located in the high density magnetic flux region between the driving and driven magnets to allow for a smaller coil footprint. As shown in FIG. 3A, the coil is positioned in a plane substantially parallel to the driving magnet and driven magnet, but may be positioned otherwise.

Preferably, the driven and driving magnets are circular disk shaped magnets having at least one pair of magnetic poles (N) and (S), and constructed of high performance magnetic material offering low physical volume and high magnetic flux, such as neodynium materials. As the rotating poles of the magnets traverse the stationary coil or coils 100, a current impulse is generated in the circuit due to the high magnetic flux density near the pole regions interacting with the coils. With rapid rotation, the LEDs appear to be powered by a fairly even power source, producing fairly consistent light emission from the LEDs. Magnets employing multiple domains, each with a set of poles, will increase the number of impulses per cycle, but the magnitude of the induced impulse current may be reduced as the magnetic regions are smaller and not creating the flux density of a single set of poles (as the time change in flux density induces the current, the larger the change, the greater the induced current). One embodiment uses a N42 neodynium iron boron magnet (NdFeB) having a single set of poles.

Figure 6:
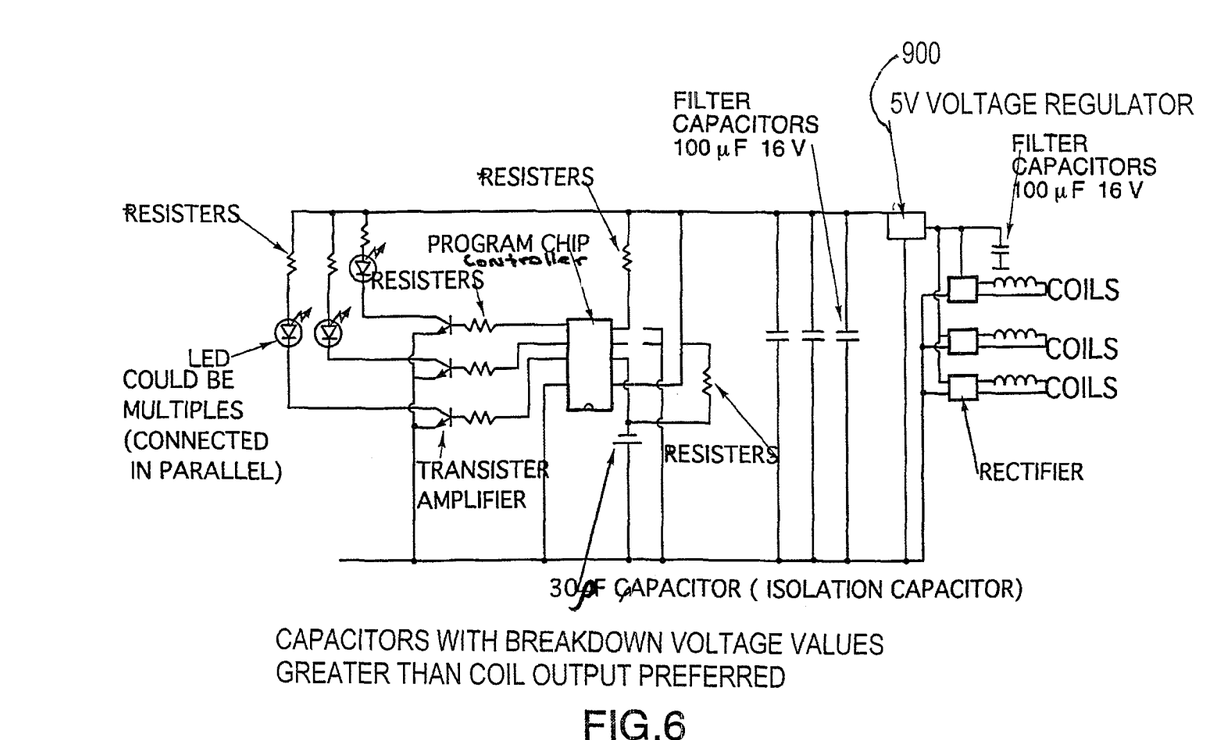
FIG. 6 is a circuit diagram of one embodiment of the light kit.

The coil may generate sufficient current to power multiple LEDs, providing the option to control or sequence the powering of the LEDs, to create a desired effect. When multiple LED's are deployed in the light kit, a program chip controller 120 can be positioned in the circuit with imbedded programming for sequencing the powering of the LED's 110 connected to that controller 120. With the inclusion of a controller 120, rectifiers may be employed to provide DC power to the controller from the coils 110. An example circuit using three coils and three LEDs is depicted in FIG. 6. As shown in FIG. 6, a single controller 120 is used to sequence the lighting of the LEDs, and transistors are employed to boost the current to the LEDs. Power to the controller is provided through voltage regulator 900 to condition the coil/rectifier produced power. In one embodiment, the light kit 20 includes three coils 110, and fifteen total LEDs 100 of four colors (red, blue, white and green) (each LED being a 20 ma 4.8×4.4 mm straw hat LED lamp). The single controller 120 is used to sequence the powering of all the LEDs (for instance, power all red LEDs at once, followed by green LEDs; or powering red 1, then red 2, then red 3 around the perimeter of the kit, etc). Alternatively, multiple controllers could be used, each controlling a subset of the total LEDs in the light kit, such as depicted in FIG. 3A.

The coil characteristics needed will depend upon the strength of the magnetic field generated, the rotational speed of the motor, and the LED power requirements. To increase the inductance and hence induced EMF, iron or ferrite core inductors may be employed.

As described, the light kit is positioned between the two magnets, but as mentioned, the kit may be mounted to the front of the pump housing, or positioned in front of the pump housing. The light kit may also be positioned on one side of the pump, however, the magnetic field strength is weaker at these locations, thereby requiring a larger coil, reduced power LED's or other means to deal with the reduced magnetic flux. The circuit components are preferably sealed in the light kit housing 32, but may be only partially encased also (for instance, the diodes could be insertable into a sealing socket in the case).

As described, the light kit is coupled to a pump mechanically isolated from the motor. The kit may also be used in a system where the pump is mechanically driven by the motor (e.g. the impellor or propeller is mechanically coupled to the motor shaft). In this instance, if the impellor or propeller is made of magnetic material, the pump system has a rotating magnet that can be used to power the light kit, such as by mounting the kit to the front of the housing in a fashion to avoid totally blocking the ports of the pump. With the present system, no external power is needed, and the system will not function unless the motor is operational. The device may include an on-off switch, preferably a switch sealed in the housing. Such a switch could be mechanical (e.g., a sealed switch push button or rocker switch accessible via a flexible sealing membrane on the housing, or could be radio controlled (which would operate when the device is powered via induced current)). The device may also be battery powered, but this is not preferred.

The invention claimed is:

1. A light kit in combination with a pump system, said pump system comprising a pump and a motor, said motor having a shaft having a driving magnet positioned on said shaft, said pump comprising a pump housing defining a pump interior, a driven magnet coupled to a pump impellor positioned in said pump interior, said pump housing having an inlet and an outlet, said pump configured be immersed in a fluid and to pump a fluid through the interior of said pump from said pump inlet to said pump outlet, said driven magnet rotatably coupled to said driving magnet only through magnetic forces, said light kit comprising a sealed housing coupled to said pump housing and a circuit positioned within said sealed housing, said circuit having a coil, said light kit having a LED, and said coil powering said LED when said driven magnet is rotating, said coil being stationary in said sealed housing.

2. The light kit in combination with a pump system of claim 1 wherein said pump housing is disk shaped.

3. The light kit in combination with a pump system of claim 1 wherein said LED is located in said pump housing interior, and said pump housing is translucent or clear in the region of said LEDs.

4. The light kit in combination with a pump system of claim 1, where said LED is attached to or integral with said pump.

5. The light kit in combination with a pump system of claim 1 wherein said light kit further comprises a plurality of said LEDs, and a controller and a rectifier positioned on said circuit, said controller electrically coupled to said rectifier and said coil and plurality of LEDs, said controller, when powered, sequencing the delivery of power to said plurality of LEDs.

6. The light kit in combination with a pump system of claim 1 wherein said coil further includes an iron or ferrite core.

7. The light kit in combination with a pump system of claim 1 wherein said LED is located in the interior of said pump housing.

8. The light kit in combination with a pump system of claim 1 wherein said LED is positioned in said circuit housing.

9. The light kit of claim 1 wherein said sealed housing is positioned intermediary said motor and said pump housing.

10. A light kit in combination with a pump system, said pump system comprising a pump, said pump comprising a pump housing defining a pump interior, a driven magnet coupled to a pump impellor positioned in said pump interior, said pump housing having an inlet and an outlet, said pump configured be immersed in a fluid and to pump a fluid through the interior of said pump from said pump inlet to said pump outlet, said driven magnet rotatably coupleable to a driving magnet on a shaft of a motor only through magnetic forces, said light kit comprising a sealed housing coupled to said pump housing and a circuit positioned within said sealed housing, said circuit having a coil, said light kit having a LED, and said coil powering said LED when said driven magnet is rotating, said coil being stationary in said sealed housing.

11. The light kit in combination with a pump system of claim 10 wherein said LED is located in said pump housing interior, and said pump housing is translucent or clear in the region of said LEDs.

12. The light kit in combination with a pump system of claim 10, where said LED is attached to or integral with said pump.

13. The light kit in combination with a pump system of claim 10 wherein said light kit further comprises a plurality of said LEDs, and a controller and a rectifier positioned on said circuit, said controller electrically coupled to said rectifier and said coil and plurality of LEDs, said controller, when powered, sequencing the delivery of power to said plurality of LEDs.

14. The light kit in combination with a pump system of claim 1 wherein said LED is located in the interior of said pump housing.

15. The light kit in combination with a pump system of claim 1 wherein said LED is positioned in said circuit housing.

* * * * *